United States Patent
O'Neill et al.

(10) Patent No.: US 9,923,212 B2
(45) Date of Patent: Mar. 20, 2018

(54) SERPENTINE FLOW FIELD WITH VARYING NUMBERS OF CHANNEL PORTIONS

(75) Inventors: Jonathan Daniel O'Neill, Manchester, CT (US); Christopher John Carnevale, South Windsor, CT (US)

(73) Assignee: Audi AG, Ingolstadt (DE)

( * ) Notice: Subject to any disclaimer, the term of this patent is extended or adjusted under 35 U.S.C. 154(b) by 421 days.

(21) Appl. No.: 14/423,684

(22) PCT Filed: Aug. 28, 2012

(86) PCT No.: PCT/US2012/052589
§ 371 (c)(1),
(2), (4) Date: Feb. 24, 2015

(87) PCT Pub. No.: WO2014/035371
PCT Pub. Date: Mar. 6, 2014

(65) Prior Publication Data
US 2015/0188150 A1    Jul. 2, 2015

(51) Int. Cl.
| | |
|---|---|
| H01M 8/02 | (2016.01) |
| H01M 8/0263 | (2016.01) |
| H01M 8/026 | (2016.01) |
| H01M 8/0258 | (2016.01) |
| H01M 8/0265 | (2016.01) |
| H01M 8/0267 | (2016.01) |

(52) U.S. Cl.
CPC ......... *H01M 8/0263* (2013.01); *H01M 8/026* (2013.01); *H01M 8/0258* (2013.01); *H01M 8/0265* (2013.01); *H01M 8/0267* (2013.01)

(58) Field of Classification Search
CPC .. H01M 8/0263; H01M 8/026; H01M 8/0267; H01M 8/0258; H01M 8/0265
See application file for complete search history.

(56) References Cited

U.S. PATENT DOCUMENTS

| | | | |
|---|---|---|---|
| 7,297,424 B2 | 11/2007 | Sugita et al. | |
| 7,465,513 B2 | 12/2008 | Blank et al. | |
| 2006/0134474 A1 | 6/2006 | Toth | |
| 2007/0202383 A1* | 8/2007 | Goebel | H01M 4/8605 429/444 |
| 2009/0029228 A1 | 1/2009 | Shibata et al. | |

FOREIGN PATENT DOCUMENTS

| | | |
|---|---|---|
| CN | 1965424 A | 5/2007 |
| CN | 101379642 A | 3/2009 |
| JP | 2004-152498 A | 5/2004 |

(Continued)

*Primary Examiner* — Ula C Ruddock
*Assistant Examiner* — Matthew W Van Oudenaren
(74) *Attorney, Agent, or Firm* — Seed IP Law Group LLP

(57) ABSTRACT

An exemplary flow field includes a plurality of flow channel portions. There are n inlet portions configured for introducing a fluid into the flow field. A plurality of first pass portions direct fluid flow in a first direction. A plurality of second pass portions direct fluid flow in a second direction that is generally parallel to and opposite to the first direction. A plurality of third pass portions direct fluid flow in the first direction. n outlet portions are configured to allow fluid to exit the flow field. n is an integer and a number of the portions in at least one plurality of pass portions is a non-integer multiple of n.

17 Claims, 3 Drawing Sheets

(56) References Cited

FOREIGN PATENT DOCUMENTS

| | | | |
|---|---|---|---|
| JP | 2005-149851 | A | 6/2005 |
| JP | 2006-049197 | A | 2/2006 |
| JP | 2006049197 | * | 2/2006 |
| JP | 2008-300096 | A | 12/2008 |
| JP | 2009-059685 | A | 3/2009 |
| WO | 2009/078792 | A1 | 6/2009 |

* cited by examiner

SERPENTINE FLOW FIELD WITH VARYING NUMBERS OF CHANNEL PORTIONS

This invention was made with government support under Contract No. CA-04-7003-00 awarded by the United States Department of Transportation. The United States Government therefore has certain rights in this invention.

TECHNICAL FIELD

The subject matter of this disclosure generally relates to components that include a flow field. More particularly, the subject matter of this disclosure relates to flow field configurations.

DESCRIPTION OF THE RELATED ART

Fuel cells are useful for generating electricity. Fuel cells facilitate an electrochemical reaction between reactants such as hydrogen and oxygen. Reactant or coolant distribution plates include flow fields having a plurality of channels for directing the reactants or coolant within a cell stack assembly. Various flow field configurations have been proposed. For example, a serpentine flow field includes portions of flow channels adjacent each other that direct the reactant or coolant fluid in opposite directions. One feature of serpentine flow field configurations is that they allow for humidification of potentially drier areas along the flow path. One challenge associated with realizing a serpentine flow field for a fluid distribution plate is that there is limited room on the plate and special design considerations must be taken into account especially when the desired number of flow paths increases.

SUMMARY

An exemplary flow field includes a plurality of flow channel portions. There are n inlet portions configured for introducing a fluid into the flow field. A plurality of first pass portions direct fluid flow in a first direction. A plurality of second pass portions direct fluid flow in a second direction that is generally parallel to and opposite to the first direction. A plurality of third pass portions direct fluid flow in the first direction. n outlet portions are configured to allow fluid to exit the flow field. n is an integer and a number of the portions in at least one of the plurality of pass portions is a non-integer multiple of n.

The various features and advantages of disclosed example embodiments will become apparent to those skilled in the art from the following detailed description. The drawings that accompany the detailed description can be briefly described as follows.

DETAILED DESCRIPTION

Disclosed example flow fields have a number n of inlet and outlet portions. The flow fields includes a non-integer multiple of n channel portions between the inlet portions and the outlet portions. The disclosed flow field arrangements are potentially useful in a variety of situations. Fuel cells require flow fields for distributing fluids such as reactants and coolants. Other devices, such as flow batteries, include flow fields and the disclosed examples may be useful in such devices. A fuel cell component including a flow field is considered for discussion purposes in the following description.

Figure 1:
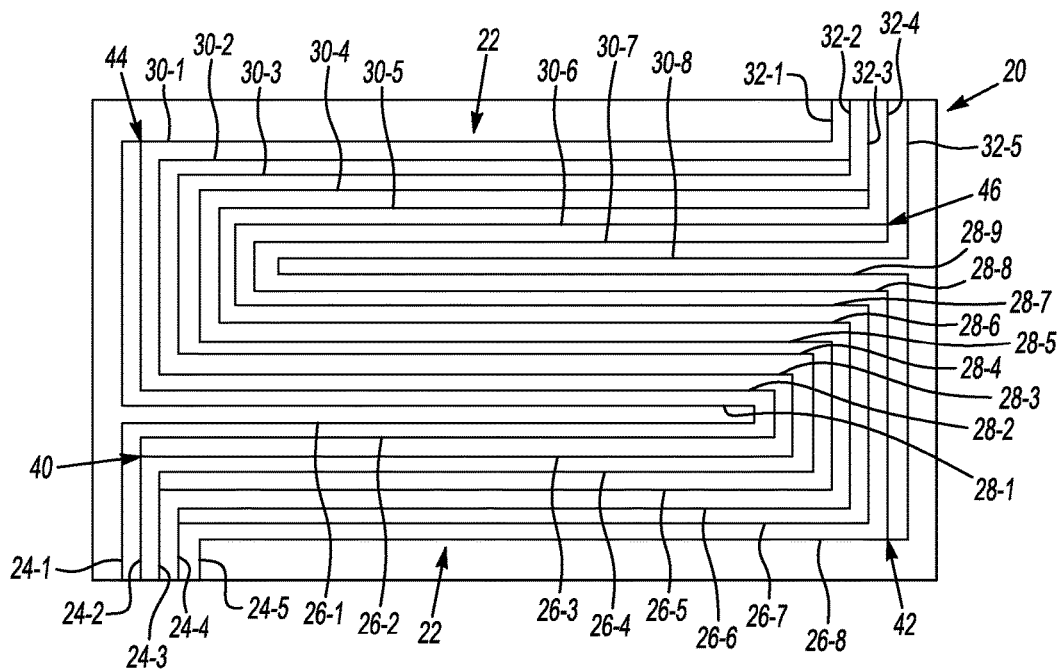
FIG. 1 schematically illustrates an example fuel cell component designed according to an embodiment of this invention.

FIG. 1 schematically illustrates a fuel cell component 20. In this example, the fuel cell component 20 is a reactant distribution plate.

A flow field 22 includes a plurality of channels for directing fluid within a fuel cell. In the illustrated example, the flow field 22 is configured for directing fluid flow within a fuel cell. This embodiment is useful for directing coolant flow to provide humidification and dissipate heat within a fuel cell.

The example flow field 22 includes a plurality of inlet portions 24. This example includes five inlet portions 24. The inlet portions 24 are configured for introducing a fluid, such as a coolant, into the flow field 22 in a direction (e.g., upward according to the drawing) toward a plurality of first pass portions 26.

The illustrated example includes eight first pass portions 26 that are connected with the inlet portions 24 for fluid flow from the inlet portions 24 into the first pass portions 26. The first pass portions 26 are situated within the flow field 22 for directing fluid flow in a first direction along a portion of the plate 20. In the illustration, the first direction is generally horizontal and from left to right. The first direction of fluid flow is intended to direct fluid toward a plurality of second pass portions 28.

In the illustrated example, there are nine second pass portions 28 connected with the first pass portions 26 for fluid movement from the first pass portions 26 into the second pass portions 28. The second pass portions 28 direct fluid flow along another portion of the plate 20 in a second direction that is generally parallel to and opposite to the first direction. The second pass portions 28 direct fluid flow along the second direction toward third pass portions 30.

The illustrated example includes eight third pass portions 30 connected with the second pass portions 28 for fluid flow from the second pass portions 28 into the third pass portions 30. The third pass portions 30 direct fluid flow in a third direction that is the same as the first direction in the illustrated example (e.g., left to right in the drawing). The third pass portions 30 direct fluid flow toward outlet portions 32.

The illustrated example includes five outlet portions 32. The outlet portions 32 are configured to allow fluid to exit the flow field 22.

As can be appreciated from the illustration, the flow field 22 has a general flow of fluid moving into the inlet portions 24, along the first pass portions 26, along the second pass portions 28, then along the third pass portions 30 and finally along the outlet portions 32.

In the illustrated example, there are an equal number of inlet portions 24 and outlet portions 32. The number of pass portions in at least one of the plurality of pass portions is a non-integer multiple of the number of inlet portions. In other words, where there are n inlet and outlet portions and at least one of the plurality of pass portions includes a number of portions that is a non-integer multiple of n. In the example of FIG. 1, there are 2n-2 first pass portions and 2n-2 third pass portions. There are 2n-1 second pass portions in the example of FIG. 1. Providing different numbers of pass portions and utilizing a non-integer multiple of the number of inlet and outlet portions allows for accommodating a larger number of inlet and outlet portions within the restricted space available on a fuel cell component such as a reactant or coolant distribution plate.

It is possible to have different numbers of pass portions in the different pluralities. Where there are n inlet portions and n outlet portions, there are 2n-a first pass portions, 2n-b second pass portions and 2n-c third pass portions. In the example of FIG. 1, a and c are equal. In the example of FIG. 1, a and c equal 2 and b equals 1. Given this description, those skilled in the art will realize other potential values for a, b or c that will meet the needs of their particular situation.

Given the different numbers of pass portions and the inclusion of a non-integer multiple of n pass portions, there are splits along at least some of the flow paths of the flow field 22 and there are merges along at least some of the flow paths. In the example of FIG. 1, the flow path that begins with the inlet portion 24-2 includes a split at 40 such that the inlet portion 24-2 is connected with each of the first pass portions 26-2 and 26-3 for fluid movement from the inlet portion 24-2 to each of the first pass portions 26-2 and 26-3. In the example of FIG. 1, there is a similar split where the inlet portion 24-3 is connected with each of the first pass portions 26-4 and 26-5. A similar split exists along the flow path that begins with the inlet portion 24-4 where the inlet portion 24-4 is connected for fluid communication with each of the first pass portions 26-6 and 26-7.

In the example of FIG. 1, the flow path beginning with the inlet portion 24-1 does not include a split. The flow path that beings with the inlet portion 24-5 includes a split at 42 near the end of the first pass portion 26-8 where it is connected with each of the second pass portions 28-8 and 28-9 to allow fluid flow into those second pass portions.

The example of FIG. 1 includes a merge at 44 where each of the second pass portions 28-1 and 28-2 are connected for fluid communication with the third pass portions 30-1. Another merge is shown at 46 where each of the third pass portions 30-6 and 30-7 are connected with the outlet portion 32-4 to allow fluid flow into that outlet portion. In the example of FIG. 1, the outlet portions 32-1 and 32-5 are each connected for fluid communication with a single one of the third pass portions as can be appreciated from the drawing.

In the example of FIG. 1, every flow path of the flow field 22 includes at least one split or at least one merge. Most of the flow paths include a split and a merge. The splits and merges facilitate using different numbers of pass portions and non-integer multiples of the number n of inlet portions 24. Using a number of pass portions that is a non-integer multiple of the number n of inlet portions 24 makes it possible to use a wider range of numbers of inlet portions 24 while still being able to realize a serpentine flow field within the restricted area available on a fuel cell component such as a fluid distribution plate. Reactant and coolant distribution plate flow fields typically require a consistent channel pitch and, for some desired number of inlet portions, it is not possible to fit an integer multiple of that number in a serpentine configuration within the size constraints of a fuel cell component. The illustrated example including the varying number of pass portions and the use of a non-integer multiple factor makes it possible to accommodate a larger number of inlet portions feeding into a plurality of pass portions that establish a serpentine flow field configuration.

Figure 2:
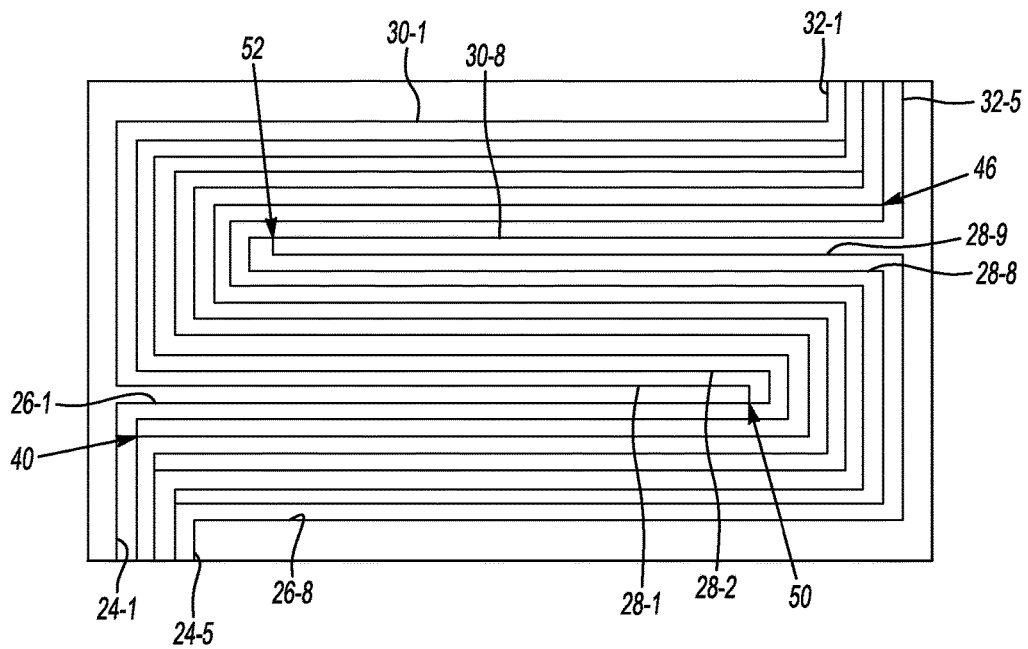
FIG. 2 schematically illustrates another example embodiment.

FIG. 2 illustrates another example embodiment. In this example, the number of inlet portions 24, outlet portions 32, first pass portions 26, second pass portions 28 and third pass portions 30 respectively equals the number included in the embodiment of FIG. 1. One difference between the embodiments of FIGS. 1 and 2 is that the split 42 of the embodiment of FIG. 1 is not included in the embodiment of FIG. 2. Instead, a split at 50 is included where the first pass portion 26-1 is connected for fluid communication with each of the second pass portions 28-1 and 28-2. Instead of the merge 44 of the example of FIG. 1, the example of FIG. 2 includes a merge at 52 where each of the second pass portions 28-8 and 28-9 are connected for fluid communication with the third pass portion 30-8. Otherwise, the example of FIG. 2 includes many of the features of FIG. 1.

Figure 3:
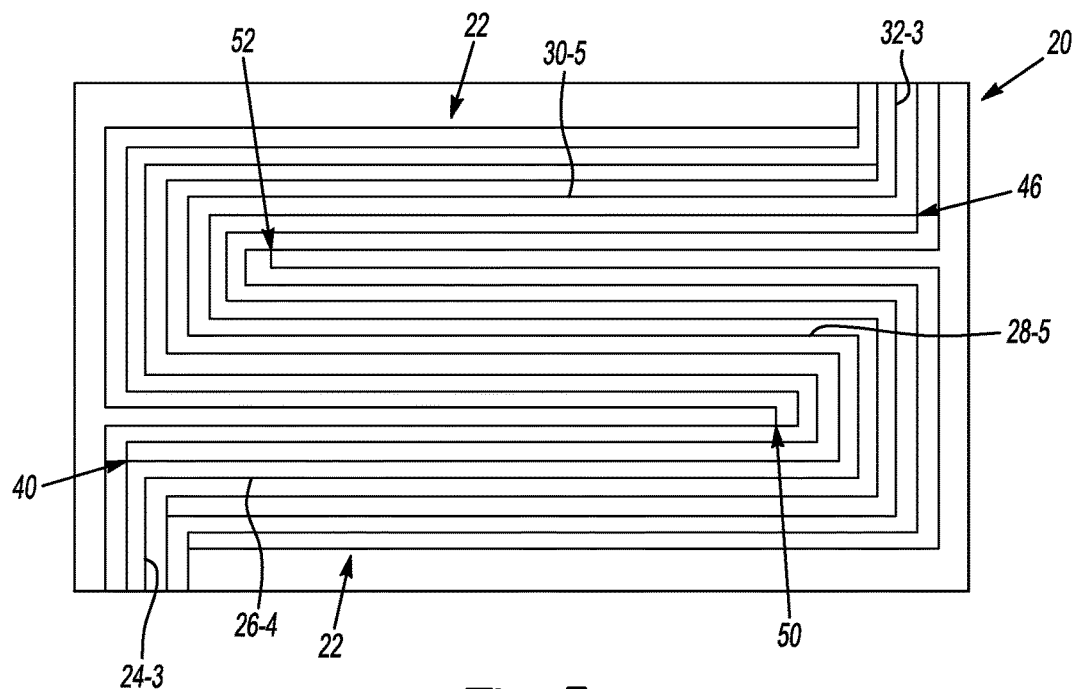
FIG. 3 schematically illustrates another example embodiment.

FIG. 3 illustrates another example embodiment. In this example, at least one of the flow paths does not include any split or any merge. The flow path including the inlet portion 24-3, the first pass portion 26-4, the second pass portion 28-5, the third pass portion 30-5 and the outlet portion 32-3 is a direct, uninterrupted flow path that does not split or merge with any other flow path portions. The arrangement of the splits and merges 50 and 52 in the example of FIG. 3 is like that of the example of FIG. 2. The splits near the ends of the other inlet portions (excluding the inlet portion 24-3) are like those in FIG. 2.

Figure 4:
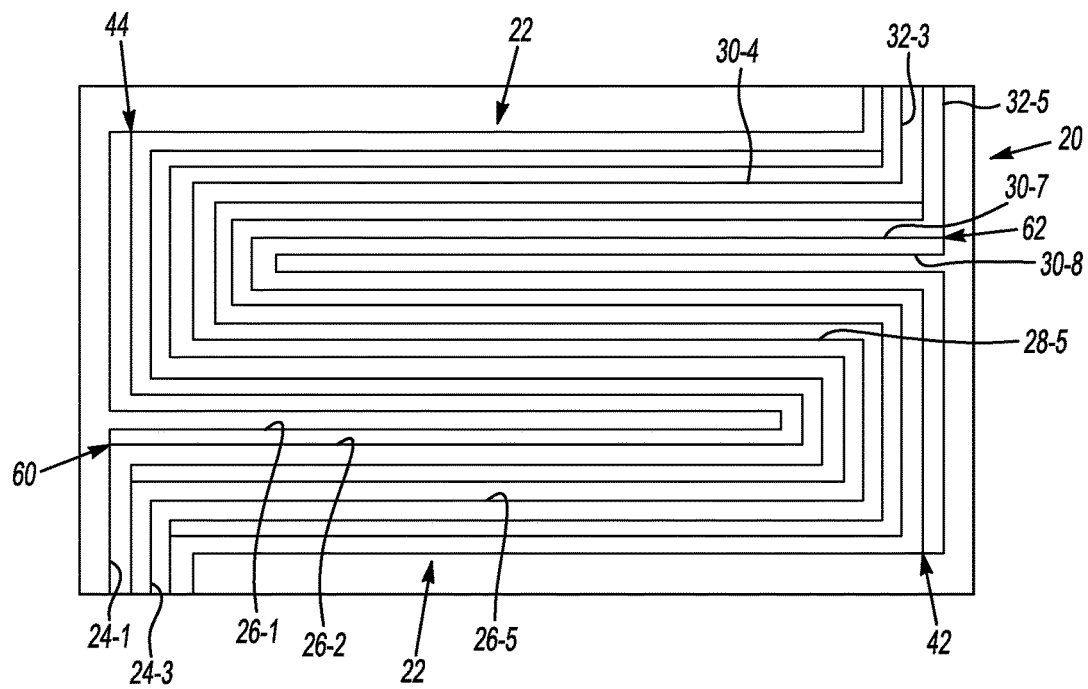
FIG. 4 schematically illustrates another example embodiment.

FIG. 4 schematically illustrates another example arrangement. This example also includes at least one flow path that does not include any splits or any merges. The flow path established by the inlet portion 24-3, the first pass portion 26-5, the second pass portion 28-5, the third pass portion 30-4 and the outlet portion 32-3 does not have any splits or merges along the entire path. In that sense, the embodiment of FIG. 4 is similar to the embodiment of FIG. 3. The arrangement of splits and merges in the embodiment of FIG. 4 is different compared to the other embodiments. A split at 42 and 44 is included in the embodiment of FIG. 4 similar to the splits 42 and 44 of the embodiment of FIG. 1. The example of FIG. 4 includes a split 60 where the inlet portion 24-1 is connected for fluid communication with the first pass portions 26-1 and 26-2. A merge 62 establishes a connection for fluid communication between the third pass portions 30-7 and 30-8 with the outlet portion 32-5.

Figure 5:
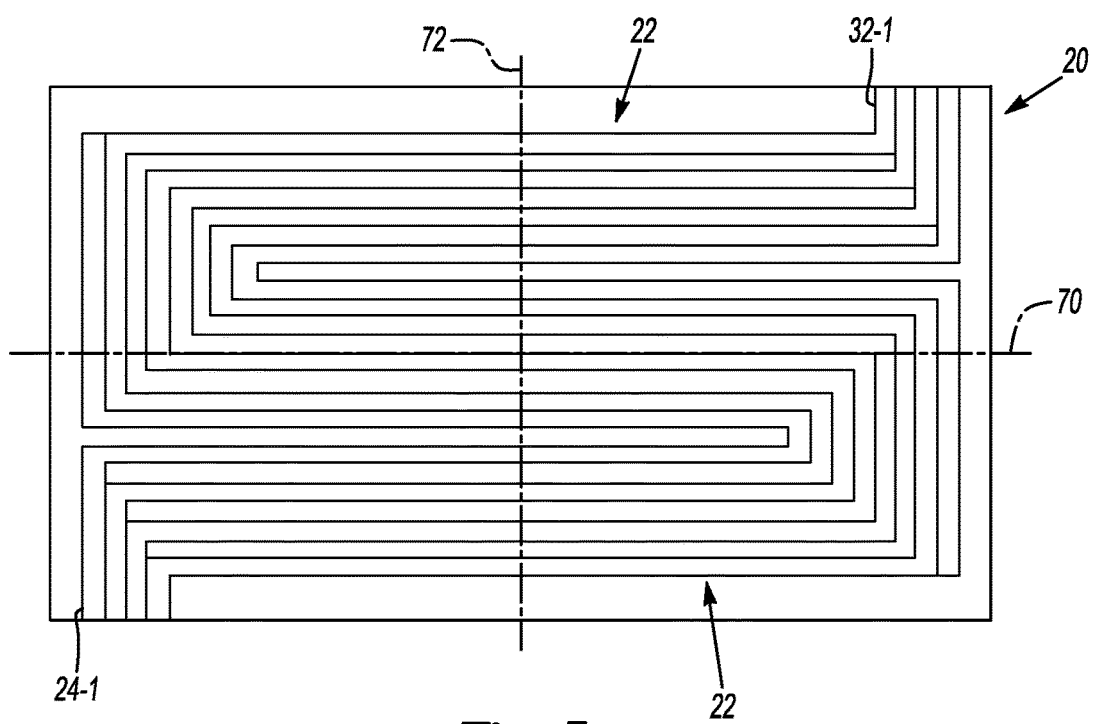
FIG. 5 schematically illustrates a symmetry feature of any of the embodiments of FIGS. 1-4.

Each of the embodiments of FIGS. 1-4 has a rotational symmetry. FIG. 5 schematically shows reference lines 70 and 72 that intersect at a center of the component 20. The flow field configuration of each of the embodiments of FIGS. 1-4 is symmetric about an axis along the intersection of the reference lines 70 and 72 when rotated 180°. Achieving rotational symmetry facilitates manufacturing economies.

Most of the channel splits in the illustrated examples are at an interface between an inlet portion and two first pass portions. Most of the merges are at an interface between two of the third pass portions 30 and an outlet portion 32. Rotational symmetry is maintained and flow maldistribution is minimized by including the splits and merges such that for every flow path that includes a split at the interface between an inlet portion and first pass portions, there is a complimentary flow path which includes a merge at the interface between the corresponding third pass portions and the outlet portion. If the flow field is rotated 180°, each flow path trades places and configurations with its complimentary flow path. There may be one flow path which is complimentary to itself. Additionally, for every inlet portion 24 which splits into two first pass portions 26, there is a complimentary outlet portion 32 in fluid communication with two third pass portions 30 which merge and which are complimentary to the two first pass portions 26. In no case does any flow path include multiple splits or multiple merges.

In the examples of FIGS. 1 and 2, the interior splits and merges involve flow paths that recombine with a different flow path than the one from which it split. In those examples, one of the inlet portions 24 does not include a split and one of the outlet portions 32 does not include a merge. In the examples of FIGS. 1 and 2, every flow path includes at least one split or at least one merge. In the examples of FIGS. 3 and 4, as described above, there is at least one flow path without any split and without any merge.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A flow field, comprising
a plurality of flow channel portions including
n inlet portions configured for introducing a fluid into the flow field,
a plurality of first pass portions that direct fluid flow in a first direction,
a plurality of second pass portions that direct fluid flow in a second direction that is parallel to and opposite to the first direction,
a plurality of third pass portions that direct fluid flow in the first direction, and
n outlet portions configured to allow the fluid to exit the flow field; and
wherein:
n is an integer and a number of the pass portions in at least one of the plurality of pass portions is a non-integer multiple of n;
a number of the pass portions in each plurality of pass portions is a non-integer multiple of n;
there are 2n-a of the first pass portions;
there are 2n-b of the second pass portions;
there are 2n-c of the third pass portions; and
a is equal to c but not b.

2. The flow field of claim 1, wherein fluid flow along the flow field moves through the inlet portions toward the first pass portions, through the first pass portions toward the second pass portions, through the second pass portions toward the third pass portions, and through the third pass portions toward the outlet portions.

3. The flow field of claim 1, wherein a, b, or c is equal to a non-zero integer.

4. The flow field of claim 3, wherein a, b or c equals 1 or 2.

5. The flow field of claim 1, wherein
a is 2;
c is 2; and
b is 1.

6. The flow field of claim 1, wherein
at least some of the inlet portions each are connected for fluid communication with more than one of the first pass portions;
at least some of the outlet portions each are connected for fluid communication with more than one of the third pass portions;
at least one of the inlet portions is connected for fluid communication with only one of the first pass portions; and at least one of the outlet portions is connected for fluid communication with only one of the third pass portions.

7. The flow field of claim 6, wherein at least one of the flow field channels consists of one of the inlet portions connected for fluid communication with only one of the first pass portions which is connected for fluid communication with only the one of the inlet portions and one of the second pass portions which is connected for fluid communication with only the one of the first pass portions and one of the third pass portions which is connected for fluid communication with only the one of the second pass portions and one of the outlet portions.

8. The flow field of claim 1, comprising a reactant or coolant distribution plate and wherein the flow field channels are established on at least one side of the distribution plate.

9. The flow field of claim 8, wherein the flow field is rotationally symmetric on the plate such that the flow field has the same configuration with respect to a reference at a center of the plate.

10. The flow field of claim 1, wherein
the flow field comprises a plurality of flow paths that each include at least one inlet portion, at least one first pass portion, at least one second pass portion, at least one third pass portion and at least one outlet portion;
at least some of the flow paths include a split of one of the portions into more than one adjacent upstream portion connected for fluid communication with the one of the portions; and
at least some of the flow paths include a merge of two of the portions into an adjacent upstream portion connected for fluid communication with the two of the portions.

11. The flow field of claim 10, wherein at least one of the flow paths does not include a split.

12. The flow field of claim 10, wherein at least one of the flow paths does not include a merge.

13. The flow field of claim 10, wherein at least one of the flow paths does not include a split and does not include a merge.

14. A flow field, comprising
a plurality of flow channel portions including
n inlet portions configured for introducing a fluid into the flow field,
a plurality of first pass portions that direct fluid flow in a first direction,
a plurality of second pass portions that direct fluid flow in a second direction that is parallel to and opposite to the first direction,
a plurality of third pass portions that direct fluid flow in the first direction, and
n outlet portions configured to allow the fluid to exit the flow field; and wherein:
n is an integer and a number of the pass portions in at least one of the plurality of pass portions is a non-integer multiple of n;
at least some of the inlet portions each are connected for fluid communication with more than one of the first pass portions;
at least some of the outlet portions each are connected for fluid communication with more than one of the third pass portions;
at least one of the inlet portions is connected for fluid communication with only one of the first pass portions; and at least one of the outlet portions is connected for fluid communication with only one of the third pass portions.

15. The flow field of claim 14 wherein:
there are 2n-a of the first pass portions;
there are 2n-b of the second pass portions;
there are 2n-c of the third pass portions; and
a is equal to c but not b.

16. The flow field of claim 14 wherein the flow field is rotationally symmetric on the plate such that the flow field has the same configuration with respect to a reference at a center of the plate.

17. The flow field of claim 14 wherein at least one of the flow field channels consists of one of the inlet portions connected for fluid communication with only one of the first pass portions which is connected for fluid communication with only the one of the inlet portions and one of the second pass portions which is connected for fluid communication with only the one of the first pass portions and one of the third pass portions which is connected for fluid communication with only the one of the second pass portions and one of the outlet portions.

* * * * *